United States Patent
Forster

(10) Patent No.: US 10,042,189 B2
(45) Date of Patent: Aug. 7, 2018

(54) BACKPLANE FOR ELECTROPHORETIC DISPLAY

(71) Applicant: Avery Dennison Corporation, Pasadena, CA (US)

(72) Inventor: Ian J. Forster, Essex (GB)

(73) Assignee: AVERY DENNISON RETAIL INFORMATION SERVICES, LLC, Mentor, OH (US)

(*) Notice: Subject to any disclaimer, the term of this patent is extended or adjusted under 35 U.S.C. 154(b) by 177 days.

(21) Appl. No.: 13/690,213

(22) Filed: Nov. 30, 2012

(65) Prior Publication Data

US 2013/0141776 A1 Jun. 6, 2013

Related U.S. Application Data

(60) Provisional application No. 61/565,563, filed on Dec. 1, 2011.

(51) Int. Cl.
| | | |
|---|---|---|
| G02B 26/00 | (2006.01) |
| G02F 1/01 | (2006.01) |
| B32B 38/04 | (2006.01) |
| G02F 1/1362 | (2006.01) |
| G02F 1/167 | (2006.01) |
| G02F 1/1343 | (2006.01) |

(52) U.S. Cl.
CPC ............ *G02F 1/0102* (2013.01); *B32B 38/04* (2013.01); *G02F 1/136227* (2013.01); *G02F 1/167* (2013.01); *G02F 1/134327* (2013.01); *G02F 2201/42* (2013.01); *G02F 2202/28* (2013.01); *Y10T 156/1082* (2015.01)

(58) Field of Classification Search
CPC .......................... G02F 1/167; G02F 2001/1678

USPC ............... 359/290–298, 237–254, 265–275
See application file for complete search history.

(56) References Cited

U.S. PATENT DOCUMENTS

| | | | | |
|---|---|---|---|---|
| 4,441,189 A | * | 4/1984 | Macklin | .................. H01S 3/097 372/56 |
| 6,844,957 B2 | * | 1/2005 | Matsumoto et al. | ......... 359/296 |
| 7,551,345 B2 | * | 6/2009 | Uchida | ................... G02F 1/167 345/107 |
| 7,821,794 B2 | | 10/2010 | Pennaz et al. | |

(Continued)

FOREIGN PATENT DOCUMENTS

| | | |
|---|---|---|
| GB | 2479081 | 9/2011 |
| JP | 5265025 | 10/1993 |

OTHER PUBLICATIONS

International Search Report dated Mar. 12, 2013 for International Application No. PCT/US2012/067220.

(Continued)

*Primary Examiner* — William R Alexander
*Assistant Examiner* — Tamara Y Washington
(74) *Attorney, Agent, or Firm* — Avery Dennison Retail Information Services, LLC

(57) ABSTRACT

A backplane for an electrophoretic display is provided with a plurality of layers, including a base film layer, an interconnect layer, a foil layer, and a display film layer. The foil layer includes at least one laser-formed gap, with the gap being defined in the foil layer after the foil layer has been applied to one of the other layers. In one embodiment, the interconnect layer is a printed interconnect layer. In another embodiment, the interconnect layer is a second foil layer.

10 Claims, 3 Drawing Sheets

(56) References Cited

U.S. PATENT DOCUMENTS

| | | |
|---|---|---|
| 2004/0008293 A1 | 1/2004 | Ishiyama et al. |
| 2004/0180476 A1 | 9/2004 | Kazlas et al. |
| 2008/0061300 A1 | 3/2008 | Chaug et al. |
| 2008/0076267 A1 | 3/2008 | Oishi et al. |
| 2010/0157411 A1* | 6/2010 | Kwon .................. G02F 1/167 359/296 |
| 2010/0265239 A1 | 10/2010 | Amundson et al. |
| 2011/0013128 A1 | 1/2011 | Ginn |
| 2011/0267568 A1 | 11/2011 | Fukuchi et al. |

OTHER PUBLICATIONS

International Preliminary Report on Patentability and Written Opinion dated Jun. 3, 2014 for International Application No. PCT/US2012/067220.

* cited by examiner

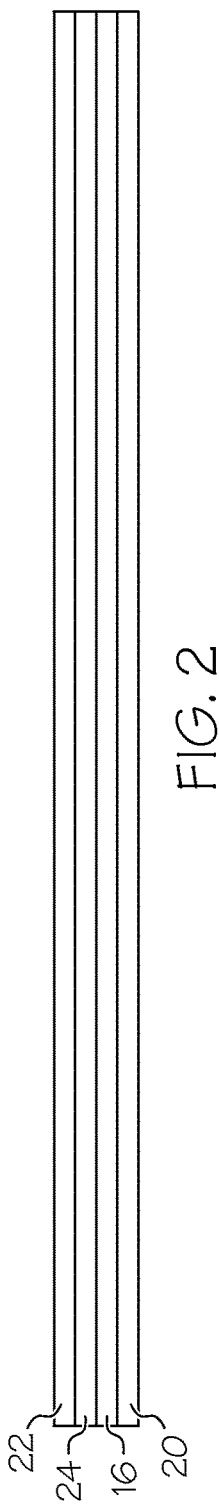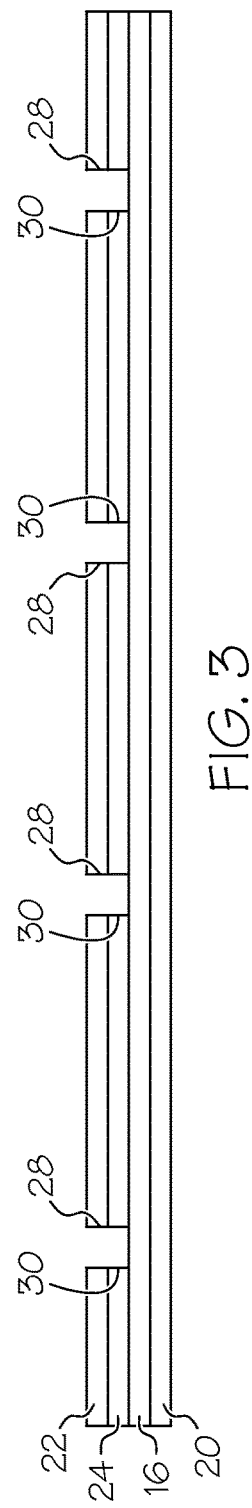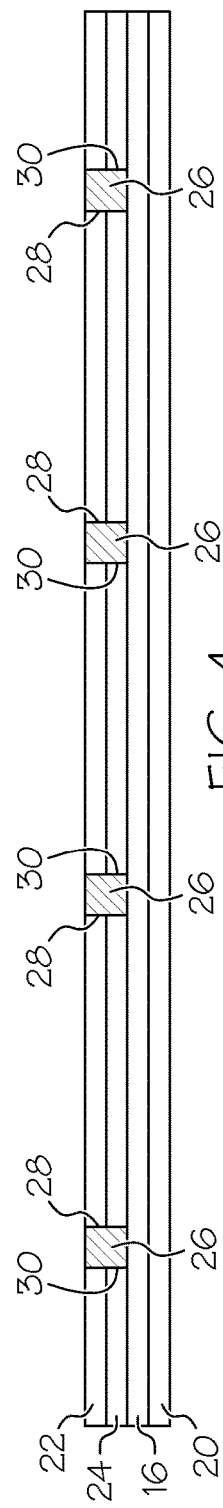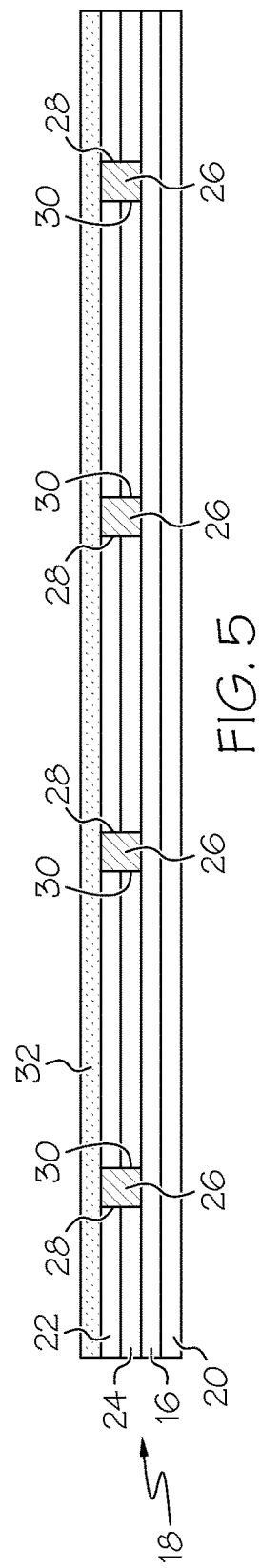

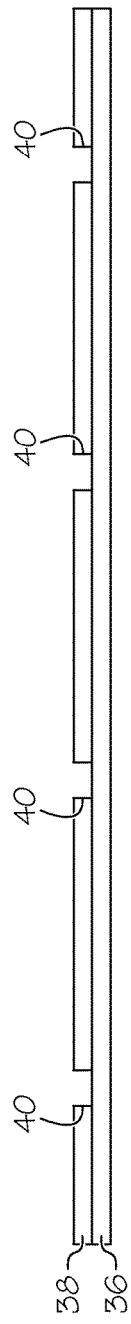
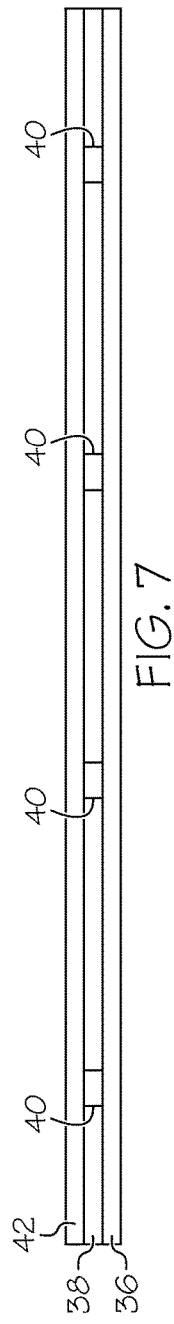
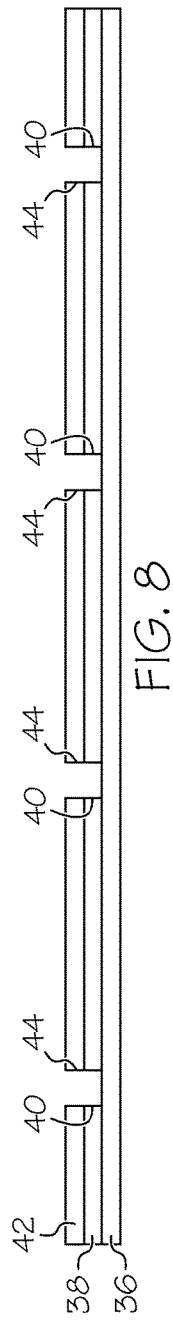
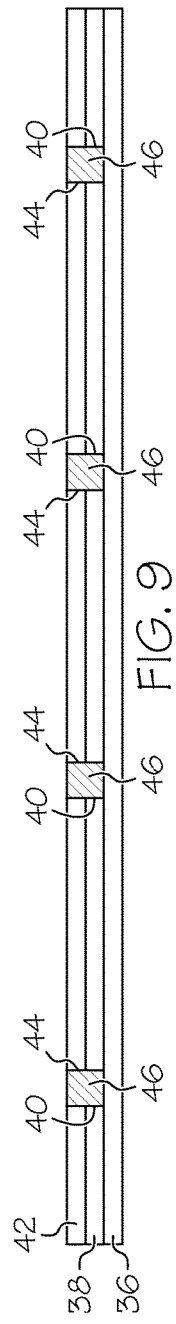
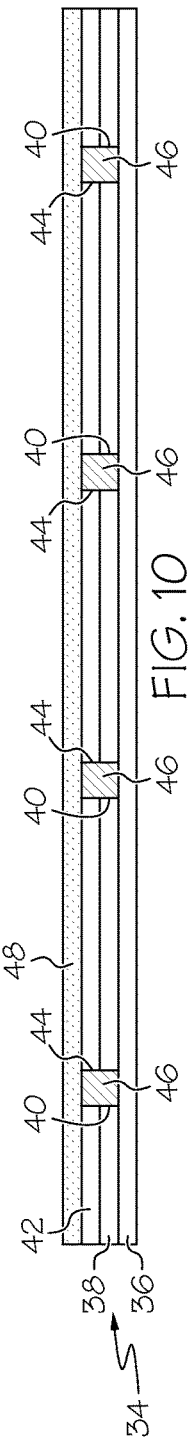

BACKPLANE FOR ELECTROPHORETIC DISPLAY

CROSS-REFERENCE TO RELATED APPLICATION

The present application claims the benefit of U.S. Provisional Patent Application No. 61/565,563 filed Dec. 1, 2011, which is incorporated herein by reference in its entirety.

FIELD OF THE DISCLOSURE

The present subject matter relates to electrophoretic displays. More particularly, the present subject matter relates to backplanes for electrophoretic displays.

DESCRIPTION OF RELATED ART

Display devices incorporating electrophoretic technology are well known for presenting information regarding an item (e.g., the sales price of or features regarding the item) to customers in a store or other shopping area or to others as an information-dissemination aid. Other applications (e.g., in cellular telephones or in "electronic paper" form in electronic reading devices) are also known to employ electrophoresis. Display devices employing electrophoresis are advantageous compared to traditional "static" displays in that they may be dynamic in nature, allowing for the displayed information to change without requiring manual intervention. Electrophoretic displays are also advantageous over other known electronic displays (e.g., backlit or liquid crystal displays) due to their low profile, readability, and flexibility.

Complex displays (e.g., those involving selectable pixels, such as an array of dots or segments of characters) can require a complex interconnection to a driver chip. If this interconnect is to be achieved on a single surface, which may be advantageous, conductive lines must be run between the display driver and the display elements or pixels. However, these conductive lines can generate electric fields that distort the image created by the display elements. Further, to get display elements with clean and crisp edges, it is preferable to have a small gap between the edge of a pixel and the surrounding metal. Unfortunately, the ideal gap dimensions are difficult or impossible to achieve using known low-cost printing processes.

SUMMARY OF THE INVENTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a backplane is provided for use in an electrophoretic display. The backplane includes a base film layer, a printed interconnect layer, a foil layer including at least one laser-formed gap, and a display film layer. The laser-formed gap is defined in the foil layer after the foil layer is applied to one of the other layers.

In another aspect, a backplane is provided for use in an electrophoretic display. The backplane includes a base film layer, a first foil layer, a second foil layer, and a display film layer. The first and second foil layers each include at least one laser-formed gap. The laser-formed gap of the first foil layer is provided prior to applying the second foil layer to the other layers. The laser-formed gap of the second foil layer is provided after applying the second foil layer to the other layers.

In a further aspect, a method is provided for manufacturing a backplane for use in an electrophoretic display. The method includes providing a base film layer and applying an interconnect layer above the base film layer. A foil layer is applied above the interconnect layer and a display film layer is applied above the foil layer. At least one laser-formed gap is defined in the foil layer after the foil layer is applied above the interconnect layer. With the present approach, the laser is able to cut a foil, such as an aluminum foil, without causing substantial damage to material positioned behind.

BRIEF DESCRIPTION OF THE DRAWINGS

FIGS. 2-5 are cross-sectional views illustrating one method of manufacturing the phosphoretic display of FIG. 1; and FIGS. 6-10 are cross-sectional views illustrating another method of manufacturing the phosphoretic display of FIG. 1.

DETAILED DESCRIPTION OF THE ILLUSTRATED EMBODIMENTS

Figure 1:
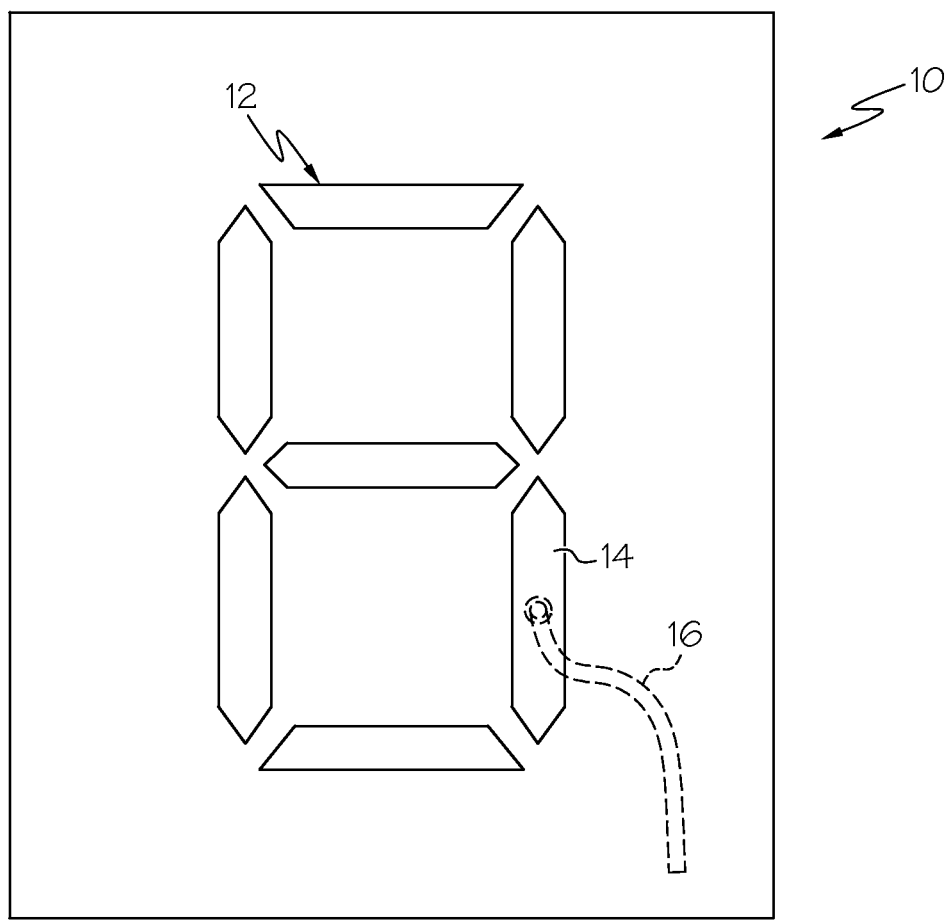
FIG. 1 is a top plan view of a phosphoretic display according to aspects of the present disclosure.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Display devices 10 according to the present disclosure are comprised of a plurality of display characters 12, each of which is comprised of a plurality of individual elements or segments or pixels 14 (FIG. 1). Each element 14 of the display character 12 is electrically connected to a driver chip or device by an interconnect layer 16. The interconnect layer 16 may be variously configured, for example, being provided as a printed interconnect layer in one exemplary embodiment and comprised of a foil material in another exemplary embodiment.

In one embodiment, the display device 10 includes a backplane 18 (FIG. 5) comprised of a plurality of layers. A base film layer 20 is provided, which may be formed of a metal material and electrically connected to a driver chip or device (not illustrated). The interconnect layer 16 is applied above the base film layer 20 (FIG. 2). As used herein to describe the relationship between layers, the term "above" does not require the layers being described to be directly adjacent to each other. For example, the interconnect layer 16 may be applied above and directly adjacent to (i.e., in direct physical contact with) the base film layer 20 or may be applied above the base film layer 20 with one or more other layers or components positioned therebetween (e.g., an adhesive layer or material). Further, the term "layer" is not intended to limit the configuration of the various elements used to construct the backplane 18 (e.g., by implying a planar construction or boundaries which are coextensive with the adjacent layers).

A foil layer 22 is applied above the interconnect layer 16 (FIG. 2). The foil layer 22 may be variously configured but, in one embodiment is comprised of an aluminum material. The foil layer 22 may be applied directly to the interconnect layer 16 or there may be other materials and/or layers 24 (FIG. 2) positioned between the interconnect layer 16 and the foil layer 22. For example, in one embodiment, the layer 24 between the foil layer 22 and the interconnect layer 16 comprises an adhesive layer. In another embodiment, the layer 24 between the foil layer 22 and the interconnect layer 16 comprises a dielectric layer. In yet another embodiment (FIGS. 6-10), the foil layer 22 is positioned directly adjacent to the interconnect layer 16, with other means being provided to secure the two together. For example, the foil layer 22 and the interconnect layer 16 may be held together by a conductive adhesive 26 deposited in a gap 28 of the foil layer 22 (as shown in FIG. 4 and as will be described in greater detail below) or by a crimping operation or the like.

Subsequent to applying the foil layer 22, one or more laser-formed gaps are cut in the foil layer 22 and, if present, the adhesive or dielectric layer 24 (FIG. 3) to define pixels. As shown in FIG. 3, the gaps 28 of the foil layer 22 are substantially aligned with the gaps 30 of the adhesive or dielectric layer 24. By laser-forming the gaps 28 and 30 instead of using other technology (e.g., photo-etching), cleaner and crisper edges are possible. The gaps 28 and 30 are formed without damaging the underlying interconnect layer 16. In one embodiment, a dielectric layer is interposed between the interconnect layer 16 and the foil layer 22, with the dielectric layer having suitable properties for reflecting the laser energy used to form the gaps 28.

Providing the foil layer 22 results in a number of benefits and advantages. For example, the foil layer 22 shields the interconnect layer 16 to avoid undesirable electric field effects that can distort the image created on the display. Further, the foil layer 22 makes ablation possible, as a region of the foil layer 22 may be selectively heated with laser energy (without vaporizing that region of the foil layer 22) to heat an underlying material. For example, ablating in the presence of the foil layer can proceed without damaging a paper substrate below the foil, or ablating can proceed in the presence of other materials such as layers of printed conductors or other foil layers.

In yet another embodiment, a printed insulator layer is provided between the foil layer 22 and the interconnect layer 16, with the printed insulator layer being heated through the foil layer 22 at a temperature below the ablation threshold. By heating the printed insulator layer, it can undergo a chemical reaction and act as a reducing agent which removes oxygen from the surface of the foil layer 22, thereby establishing a connection with the underlying interconnect layer 16. Selective heating of the foil below the ablation threshold reduces oxide formation on the foil surface and establishes a connection with the conductor (such as a printed conductor) under the chemically transformed layer that previously had been an insulator.

With gaps formed in the foil layer 22 (and the adhesive or dielectric layer 24, if provided), a conductive adhesive 26 may be deposited into the gaps 28 and 30 (FIG. 4), followed by a display film layer 32 being applied above the film layer 22 (FIG. 5).

In an alternative embodiment, illustrated in FIGS. 6-10, a backplane 34 (FIG. 10) is comprised of a plurality of layers, including a base film layer 36 and an interconnect layer 38 applied above the base film layer 36. The interconnect layer 38 is provided as a foil material having one or more laser-formed gaps 40 to define an interconnect (FIG. 6). The laser-formed gaps 40 are defined in the interconnect layer 38 prior to applying any other layers above the interconnect layer 38 and may be defined in the interconnect layer 38 before or after the interconnect layer 38 is applied above the base film layer 36.

With the gaps 40 formed in the interconnect layer 38, a foil layer 42 is applied above the interconnect layer 38 (FIG. 7). The foil layer 42 may be applied directly to the interconnect layer 38 (FIG. 7) or there may be other materials and/or layers (e.g., an adhesive layer) positioned between the interconnect layer 38 and the foil layer 42.

Subsequent to applying the foil layer 42, one or more laser-formed gaps 44 are cut in the foil layer 42 (FIG. 8) to define pixels. As shown in FIG. 8, the gaps 40 of the interconnect layer 38 are substantially aligned with the gaps 44 of the foil layer 42. The gaps 44 are formed in the foil layer 42 without damaging the underlying interconnect layer 38.

With gaps 44 formed in the foil layer 42, a conductive adhesive 46 may be deposited into the gaps 40 and 44 (FIG. 9), followed by a display film layer 48 being applied above the film layer 42 (FIG. 10).

The various aspects and features described with respect to the two illustrated embodiments are not exclusive to the respective embodiment, but may be used with the other embodiment or any other backplane employing aspects of the present disclosure. For example, the backplane 18 of FIG. 5 may be provided without an adhesive or dielectric layer 24 between the interconnect layer 16 and the foil layer 22, while the backplane 34 of FIG. 10 may be provided with an adhesive or dielectric layer between the interconnect layer 38 and the foil layer 42.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

What is claimed is:

1. A backplane for use in an electrophoretic display, comprising:
    a base film layer;
    a printed interconnect layer that is a foil material having one or more laser-formed gaps;
    a foil layer comprised of an aluminum material including at least one laser-formed gap; where a region of the foil layer may be selectively heated with laser energy without vaporizing the region; and
    a display film layer, wherein said at least one laser-formed gap is defined in the foil layer after the foil layer is applied to one of the other layers; and
    a printed insulator layer positioned between the foil layer and the interconnect layer.

2. The backplane of claim 1, further comprising an adhesive layer positioned adjacent to the printed interconnect layer and the foil layer.

3. The backplane of claim 2, further comprising at least one laser-formed gap defined in the adhesive layer.

4. The backplane of claim 3, wherein at least one of the laser-formed gaps of the foil layer is substantially aligned with at least one of the laser-formed gaps of the adhesive layer.

5. The backplane of claim 1, further comprising a conducive adhesive positioned in at least one of the laser-formed gaps of the foil layer.

6. The backplane of claim 1, further comprising a dielectric layer positioned adjacent to the printed interconnect layer and the foil layer.

7. The backplane of claim 6, further comprising at least one laser-formed gap defined in the dielectric layer.

8. The backplane of claim 1, wherein the printed insulator layer is heated through the foil layer at a temperature below an ablation threshold.

9. The backplane of claim 1, further comprising an adhesive layer between the foil layer and the interconnect layer.

10. The backplane of claim 1, wherein the foil layer is applied directly to the interconnect layer.

\* \* \* \* \*